(No Model.)
J. L. MARTIN.
Process and Apparatus for Aging Liquors.
No. 229,542.             Patented July 6, 1880.
FIG. I.
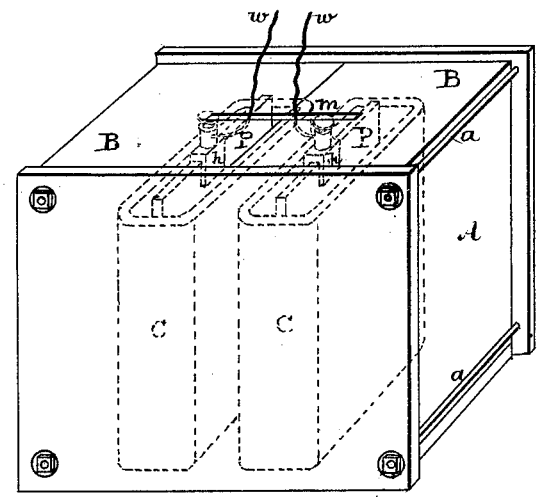
FIG. II.      FIG. III.      FIG. IV.
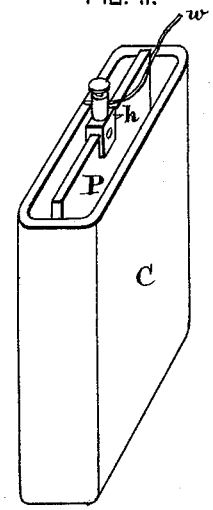 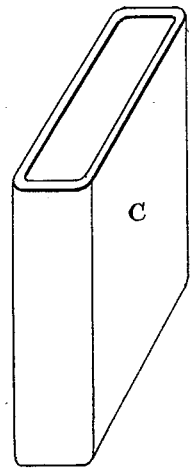 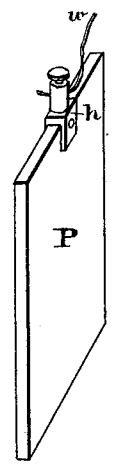
FIG. V.
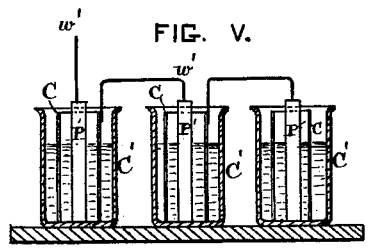
WITNESSES:             INVENTOR:
Jos. Lloyd Martin

UNITED STATES PATENT OFFICE.

JOSEPH L. MARTIN, OF BALTIMORE, MARYLAND.

PROCESS AND APPARATUS FOR AGING LIQUORS.

SPECIFICATION forming part of Letters Patent No. 229,542, dated July 6, 1880.

Application filed April 22, 1880. (No model.)

*To all whom it may concern:*

Be it known that I, JOSEPH LLOYD MARTIN, a citizen of the United States, residing in the city of Baltimore and State of Maryland, have invented certain new and useful Improvements in Aging Spirits and other Alcoholic Liquors; and I do hereby declare that the following is a full, clear, and exact description of the same, reference being made to the accompanying drawings and the letters marked thereon, which form part of this specification, in which—

Figure I is a perspective view of the apparatus used in carrying out the invention; Fig. II, a similar view of a single cell with its plate in position; Figs. III and IV, detached views, and Fig. V a vertical cross-section of three battery-cells.

Like letters denote like parts in all the figures.

The invention is an improvement on that for which I obtained Letters Patent dated December 2, 1879, No. 222,293, for changing, altering, or modifying fresh or recently-distilled whisky, brandy, gin, wine, or any and all other alcoholic liquors, so as to render them essentially the same as if they had lain in casks for years and then become modified by age, which change, alteration, or modification I accomplish by the imponderable agent electricity and the well-known principle and effects of catalysis in combination, as set forth in said patent.

My new invention of improvements consists, first, in the use, for the treatment of alcoholic liquors, of a water-tight wooden tank or cistern with tightly-fitting cover, charred or not inside, or a tank made of any non-metallic substance, such as glass, porcelain, or enameled ware, which shall not become an electrode in electric circuit; second, in the use of hollow diaphragms or porous cells made of baked clay or other material compact or solid enough to admit mainly of the passage of an electric current through by endosmosis and exosmosis. Into these cells are placed carbon diaphragms or plates covered with platinum-black; or instead of plates covered with platinum, spongy platinum itself, or other catalytic agents, such as charcoal, may be placed in the cells.

By these improvements the liquor or spirits subjected to the operation acquire color, richness of taste, and qualities from the charred wooden tank which are contributed by long keeping in wooden casks or barrels, and which are not thus contributed by metallic substances used as tanks or cisterns. There is no metallic or poisonous matter or influence conveyed to or incorporated with the liquor under treatment, as is the case when copper or other metallic tanks are used, especially when such metallic tank forms an electrode or is connected with one pole of the battery, in which case the metal is given off largely to the liquor and incorporated in it.

By my present invention the liquid is also protected from impregnation with any black or other coloring matter derived from the carbon plates or diaphragms, or from iron in the carbon, which is often noticeable, or from any other objectionable matter from the plates or catalytic agents in the hollow diaphragms. The electric current thus transmitted through the hollow diaphragms is much more uniform, milder, and gentler in its effects upon the liquor treated than when it passes directly through the liquor without such intervening substances.

In order that others skilled may be able to apply and use my new improvements, I give the following description of the construction of apparatus suitable for carrying into operation the invention.

In the drawings, A shows a strong tight wooden tank securely held together by the rods a. The cover B B is divided in the center, each half fitting in grooves in the side of tank A, so that the cover may be readily removed or replaced.

A slot, m, is made in the cover, so as to permit the passage of the conducting-wires w from a galvanic battery or other means for producing an electric current to plates P, which are immersed in the porous cells C.

The usual clamps and screw-cups for connecting the wires from the battery or electrical machine with the diaphragms are shown at h.

In Fig. V is shown a vertical section of a galvanic battery of three cells, C′ being the cup, C a porous cell of earthenware, and P′ a zinc or corresponding part of a battery where zinc is not used, and w the conducting-wire.

The battery or means for generating a current of electricity forms no part of my invention, and therefore need not be particularly described. Any suitable means for the purpose which will produce a current of sufficient intensity and constancy may be used.

In operating or conducting my process or method I do not confine myself to the exact form or construction of apparatus as set forth, or the material of which such apparatus is constructed, as stated or laid down in the drawings or specification, for it is obvious that the same results may be obtained, analogous, though not identical, without changing the principle of action or application.

In my patent of December 2, 1879, I used the combined action of electricity and the catalytic force for aging spirits. The tank was of metal, and was connected with one of the poles of the galvanic battery or other means of generating an electric current. The catalytic agent in the form of a platinized plate, platinized carbon, or other similar means was connected with the other pole, and all placed directly in contact with the spirits in the tank.

Now in my present invention I use the same agencies, but they act through the medium of porous cells or diaphrams. No metal that could be dissolved or material that could give any disagreeable taste or color to the spirits is in the body of the spirit.

I do not claim as my invention any form of galvanic apparatus or any means for generating a current of electricity.

I am aware that in galvanic batteries one of the elements has been placed in a porous cell; but in aging spirits by means of an electric current and by catalytic agents I am not aware that these have been made to act upon the mass of the spirits through a porous cell or diaphragm and while inclosed in a wooden tank.

Having thus described my invention, what I claim, and desire to secure by Letters Patent of the United States, is—

1. The process herein described for aging or changing the quality of spirits and other alcoholic liquors, such as herein mentioned, the same consisting in causing the changing influence, such as a current of electricity or a catalytic agent, to act through the medium of a porous cell upon liquor while held in a wooden or a non-metallic vessel, substantially as set forth.

2. The process of aging liquor by subjecting the same to the combined action of a current of electricity and a catalytic agent acting upon the liquor through the medium of a porous diaphragm or cell, as described.

3. In apparatus for aging spirits and other alcoholic liquors, the combination of means, substantially such as described, for producing a current of electricity, a porous vessel for containing catalytic agents, and a wooden or other non-metallic vessel, substantially as described.

JOS. LLOYD MARTIN.

Witnesses:
A. MOORE,
GEO. M. LOCKWOOD.